(12) United States Patent
Koontz et al.

(10) Patent No.: US 9,021,917 B2
(45) Date of Patent: May 5, 2015

(54) MOTION TRANSMITTING REMOTE CONTROL ASSEMBLY HAVING A TERMINAL BODY WITH A TRANSVERSE OPENING

(75) Inventors: Harry Edward Koontz, Troy, MI (US); Jonathan Warner Love, Waterford, MI (US)

(73) Assignee: Kongsberg Driveline Systems I, Inc., Novi, MI (US)

( * ) Notice: Subject to any disclaimer, the term of this patent is extended or adjusted under 35 U.S.C. 154(b) by 305 days.

(21) Appl. No.: 13/524,690

(22) Filed: Jun. 15, 2012

(65) Prior Publication Data

US 2012/0318091 A1    Dec. 20, 2012

Related U.S. Application Data

(60) Provisional application No. 61/498,194, filed on Jun. 17, 2011.

(51) Int. Cl.
*F16C 1/22* (2006.01)
*F16C 1/14* (2006.01)

(52) U.S. Cl.
CPC ............ *F16C 1/14* (2013.01); *Y10T 74/20049* (2015.01); *Y10T 74/20462* (2015.01); *F16C 1/223* (2013.01)

(58) Field of Classification Search
USPC .......................... 74/473.15, 500, 502.4, 502.6
See application file for complete search history.

(56) References Cited

U.S. PATENT DOCUMENTS

| 4,023,435 | A |   | 5/1977 | LaDue |   |
|---|---|---|---|---|---|
| 5,261,293 | A |   | 11/1993 | Kelley |   |
| 5,280,733 | A |   | 1/1994 | Reasoner |   |
| 5,293,785 | A |   | 3/1994 | Lichtenberg |   |
| 5,295,408 | A |   | 3/1994 | Nagle et al. |   |
| 5,522,276 | A |   | 6/1996 | Lichtenberg |   |
| 5,531,134 | A |   | 7/1996 | Petruccello |   |
| 5,584,212 | A |   | 12/1996 | Wild |   |
| 5,588,334 | A | * | 12/1996 | Lu et al. | 74/502.6 |
| 5,598,743 | A |   | 2/1997 | Yasuda |   |
| 5,655,415 | A |   | 8/1997 | Nagle et al. |   |
| 5,664,461 | A | * | 9/1997 | Kitamura | 74/502.4 |
| 6,098,489 | A |   | 8/2000 | Van Zanten et al. |   |
| 6,109,132 | A |   | 8/2000 | Frye |   |
| 6,321,893 | B1 | * | 11/2001 | Muhlert et al. | 192/99 S |
| 6,571,658 | B2 |   | 6/2003 | Koontz et al. |   |
| 7,044,018 | B2 |   | 5/2006 | Sanchez et al. |   |
| 7,146,875 | B2 |   | 12/2006 | Gordy et al. |   |
| 2010/0251847 | A1 | * | 10/2010 | Gordy | 74/502.6 |

* cited by examiner

*Primary Examiner* — Vicky Johnson
(74) *Attorney, Agent, or Firm* — Howard & Howard Attorneys PLLC

(57) ABSTRACT

The subject invention provides for a motion transmitting remote control assembly for transmitting motion in a curved path, including a terminal body defining a longitudinal axis and a cavity. The terminal body further defines a first opening extending transverse to the longitudinal axis. A locking member is disposed within the cavity and is movable between a locked position and an unlocked position. The locking member has a trigger portion retaining the locking member in the unlocked position and a securing portion. A biasing member is disposed within the cavity and abuts the locking member. The terminal body further defines a second opening extending transverse to both the longitudinal axis and the first opening into the cavity. The second opening provides access to the trigger portion to release the locking member from the unlocked position to the locked position and the securing portion at least partially closes the second opening.

21 Claims, 12 Drawing Sheets

MOTION TRANSMITTING REMOTE CONTROL ASSEMBLY HAVING A TERMINAL BODY WITH A TRANSVERSE OPENING

RELATED APPLICATION

This application claims priority to and all advantages of U.S. Provisional Patent Application No. 61/498,194, which was filed on Jun. 17, 2011.

BACKGROUND OF THE INVENTION

1. Field of the Invention

The subject invention generally relates to a motion transmitting remote control assembly for transmitting motion in a curved path. In particular, the subject invention relates to a unique design of a terminal body for the assembly.

2. Description of Related Art

There is a desire within the industries utilizing motion transmitting remote control assemblies to couple a terminal body to a pin with the terminal body automatically secured to the pin upon coupling. Many techniques have been used to automatically secure the terminal body to the pin. One solution in the industry is disclosed in U.S. Pat. No. 6,109,132 (the '132 patent). Specifically, the '132 patent discloses a motion transmitting remote control assembly having a terminal body and a pin. The pin has a tapered head and a neck. The tapered head and the neck each have a diameter with the diameter of the tapered head greater than the diameter of the neck. The terminal body has a bore within which the pin is disposed. A locking member defines a hole and has a pair of biasing wings partially disposed within the bore of the terminal body. Upon insertion of the pin, the tapered head engages the hole and translates the locking member against the bias of the biasing wings. When the neck is disposed within the hole of the locking member, the lesser diameter of the neck in conjunction with the bias of the biasing wings causes the locking member to translate toward the biasing wings. The hole of the locking member and the tapered head are non-concentric such that the head engages the locking member. As such, the pin is retained within the terminal body. To couple the terminal body to the pin, the terminal body must stack on top of the pin and move longitudinally down the pin. As such, space above the head of the pin to facilitate engagement of the terminal body with the pin must be considered when applying the motion transmitting remote control assembly in industry.

Therefore, there remains an opportunity to develop a motion transmitting remote control assembly having a terminal body that can be mounted in a more efficient manner.

SUMMARY OF THE INVENTION AND ADVANTAGES

The subject invention provides for a motion transmitting remote control assembly for transmitting motion in a curved path. The motion transmitting remote control assembly includes a terminal body defining a longitudinal axis and a cavity within the terminal body. The terminal body further defines a first opening extending transverse to the longitudinal axis into the cavity. A locking member is disposed within the cavity of the terminal body and is movable between a locked position and an unlocked position. The locking member has a trigger portion retaining the locking member in the unlocked position and a securing portion spaced from the trigger portion. A biasing member is disposed within the cavity of the terminal body and abuts the locking member to continuously bias the locking member toward the locked position. The terminal body further defines a second opening extending transverse to both the longitudinal axis and the first opening into the cavity. The second opening provides access to the trigger portion to release the locking member from the unlocked position such that the locking member moves from the unlocked position to the locked position and the securing portion at least partially closes the second opening.

Additionally, the subject invention provides for a shift mechanism for selecting one of a plurality of gears of a transmission of a vehicle. The shift mechanism includes a lever adapted to be pivotably coupled to the transmission with the lever pivotable between a plurality of positions. A pin is mounted to the lever for concurrent movement of the pin and the lever between the positions. The shift mechanism further includes a motion transmitting remote control assembly. The motion transmitting remote control assembly includes a terminal body defining a longitudinal axis and a cavity within the terminal body. The terminal body further defines a first opening extending transverse to the longitudinal axis into the cavity. A locking member is disposed within the cavity of the terminal body and movable between a locked position and an unlocked position. The locking member has a trigger portion retaining the locking member in the unlocked position and a securing portion spaced from the trigger portion. A biasing member is disposed within the cavity of the terminal body and abuts the locking member to continuously bias the locking member toward the locked position. The terminal body further defines a second opening extending transverse to both the longitudinal axis and the first opening into the cavity. The pin engages the trigger portion through the second opening to release the locking member from the unlocked position such that the locking member moves from the unlocked position to the locked position. The securing portion at least partially closes the second opening such that the locking member partially surrounds the pin to secure the pin to the motion transmitting remote control assembly.

Accordingly, the subject invention provides for a motion transmitting remote control assembly having a terminal body defining a transverse opening that allows the terminal body to couple along a longitudinal cross-section of a pin. Furthermore, the motion transmitting remote control assembly allows for reduced space above the pin when the motion transmitting remote control assembly is applied to various applications.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figure 1A:
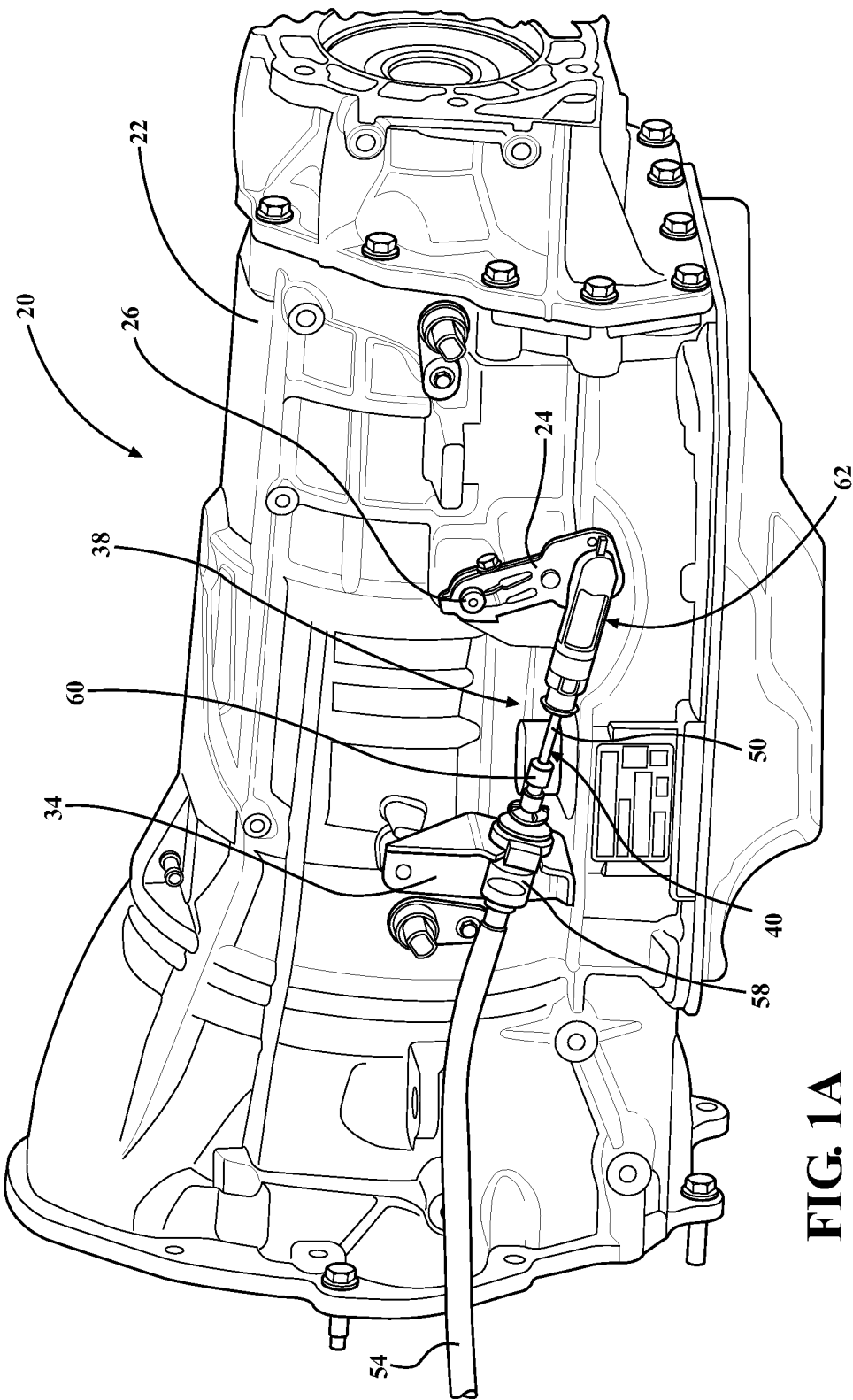
FIG. 1A is a perspective view of a shift mechanism.
Figure 1B:
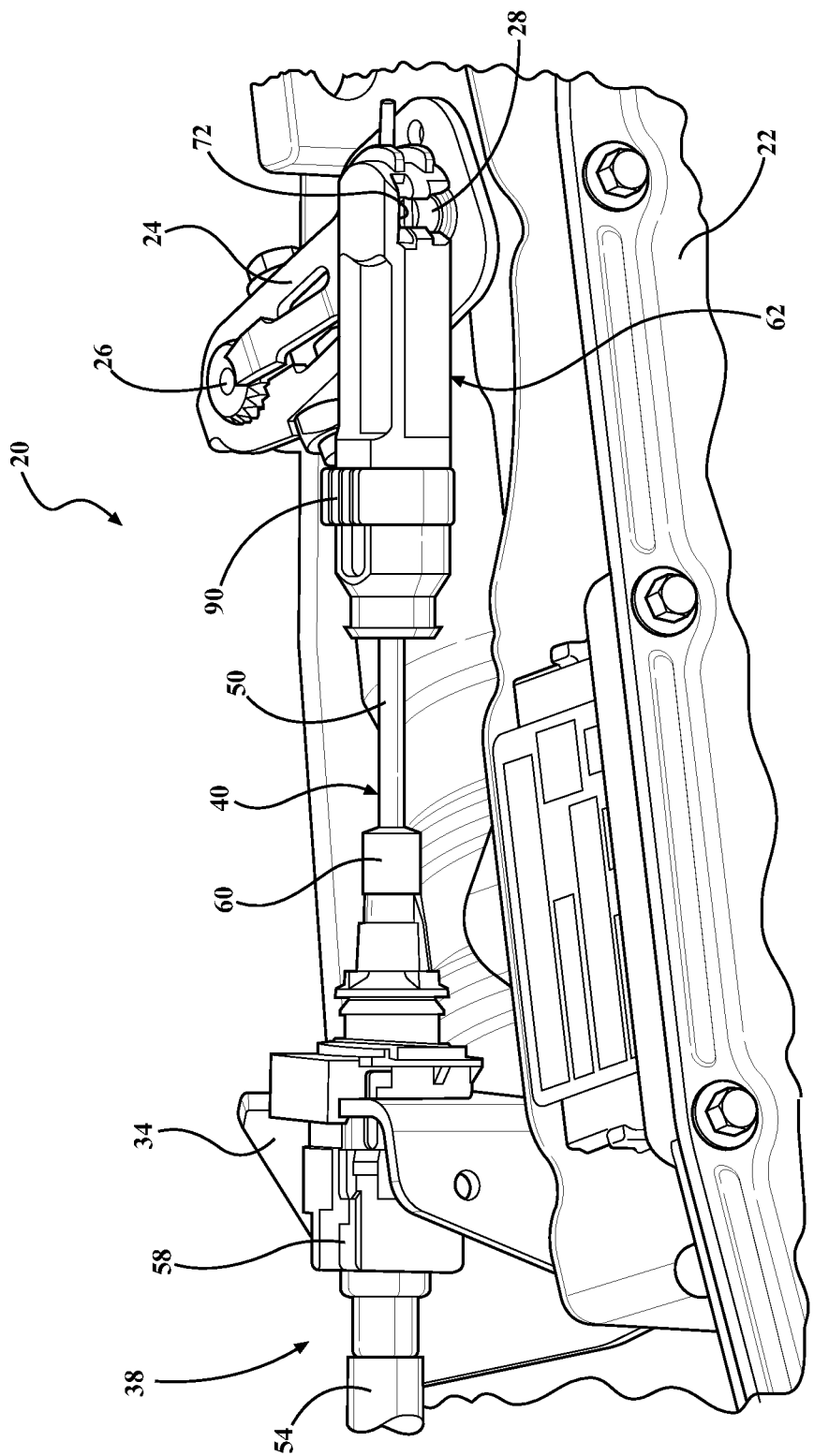
FIG. 1B is a bottom perspective view of the shift mechanism.

Referring to the Figures, wherein like numerals indicate like or corresponding parts throughout the several views, a shift mechanism 20 for selecting one of a plurality of gears of a transmission 22 of a vehicle is generally shown in FIGS. 1A and 1B. The shift mechanism 20 includes a lever 24 adapted to be pivotably coupled to the transmission 22. More specifically, the lever 24 extends to distal ends. A shaft 26 is disposed at one of the distal ends and extends into and pivotably couples the lever 24 to the transmission 22. The lever 24 is pivotable between a plurality of positions. Each of the positions corresponds to one of the gears of the transmission 22.

Figure 2:
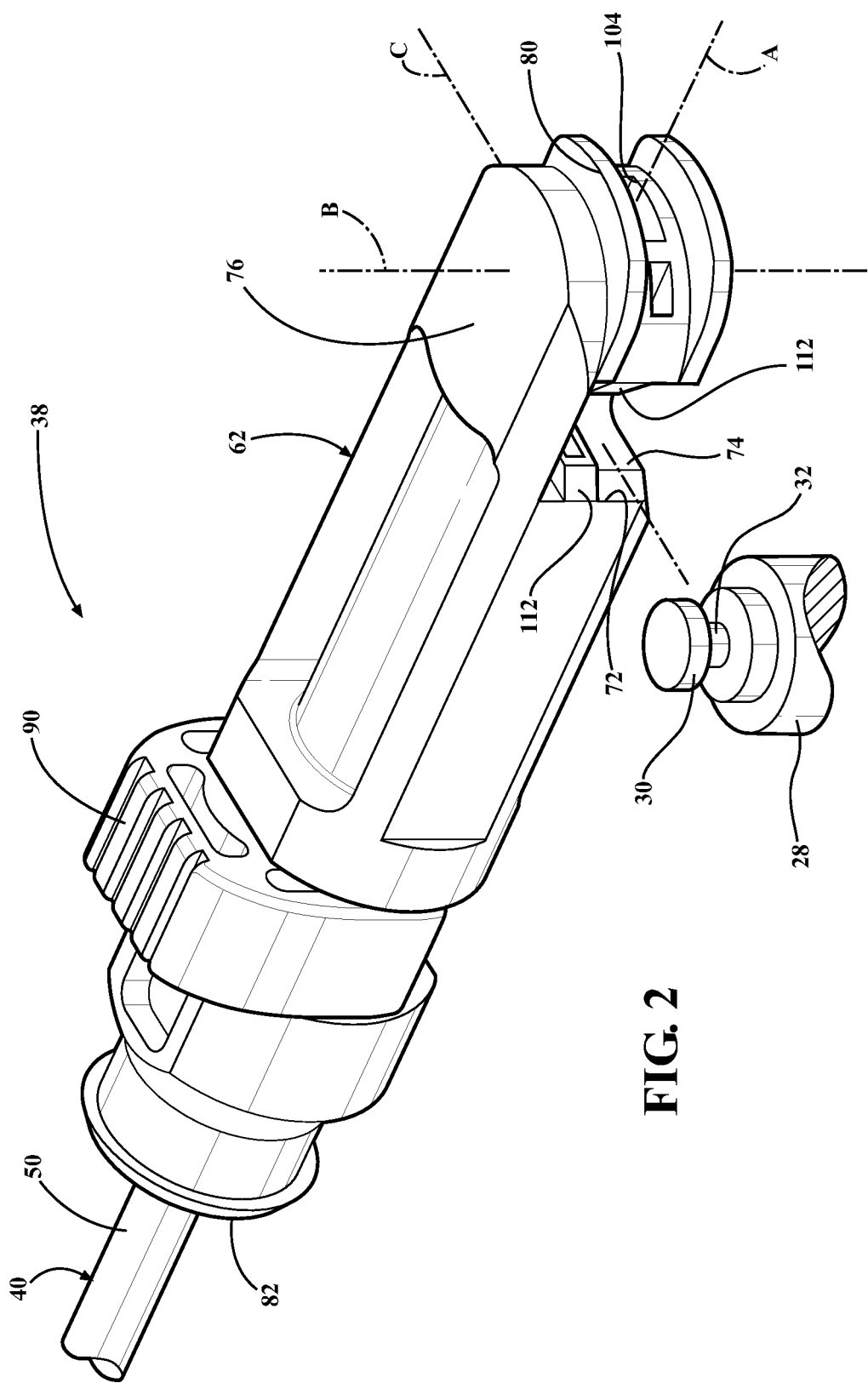
FIG. 2 is a perspective view of a terminal body of a motion transmitting remote control assembly and a pin.

The shift mechanism 20 further includes a pin 28 mounted to the lever 24 for concurrent movement of the pin 28 and the lever 24 between the positions, as shown in FIG. 1B. More specifically, the pin 28 is disposed at the other distal end of the lever 24, opposite the shaft 26. As shown in FIG. 2, the pin 28 has a head 30. More specifically, the pin 28 extends from the lever 24 to the head 30. The pin 28 also has a neck 32 disposed between the head 30 and the lever 24. Both the head 30 and the neck 32 have a cylindrical configuration with the head 30 and neck 32 disposed concentrically. The head 30 extends radially from the neck 32 such that the head 30 presents a larger cylindrical configuration than the neck 32.

Turning back to FIGS. 1A and 1B, the shift mechanism 20 further includes a support bracket 34. The support bracket 34 defines an opening extending through the support bracket 34. Furthermore, the support bracket 34 is mounted to the transmission 22.

The shift mechanism 20 further includes a motion transmitting remote control assembly 38 for transmitting motion in a curved path. Specifically, the motion transmitting remote control assembly 38 transmits motion to the lever 24, causing the lever 24 to pivot relative to the transmission 22. The motion transmitting remote control assembly 38 is secured to the pin 28, which is mounted to the lever 24. Although in the present embodiment the lever 24 is shown as being coupled to the transmission 22, it is to be appreciated that the lever 24 can refer to what is commonly known in the art as a shift lever pivotably coupled to the transmission 22. In such an embodiment, the shift lever is remotely disposed from the transmission 22 with the shift lever adapted to be pivotably coupled to the transmission 22. The shift lever is pivotable between a plurality of positions. The pin 28 is mounted to the shift lever for concurrent movement of the pin 28 and the shift lever between the positions. The motion transmitting remote control assembly 38 is secured to the pin 28 as described above and the motion transmitting remote control assembly 38 is further coupled to the transmission 22 such that the shift lever is pivotably coupled to the transmission 22.

Figure 4:
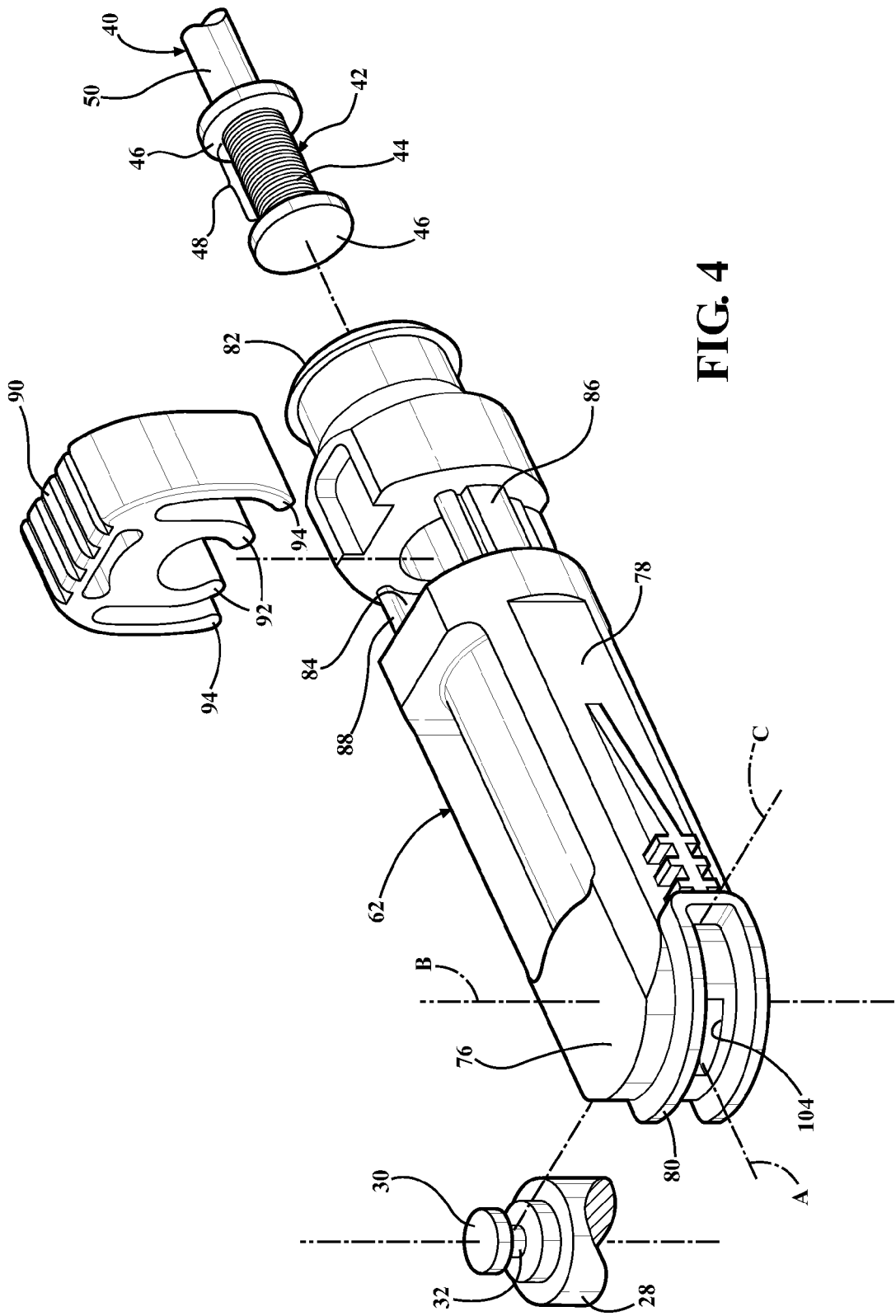
FIG. 4 is an exploded view of the terminal body.

As also shown in FIG. 4, the motion transmitting remote control assembly 38 includes a core element 40. The motion transmitting remote control assembly 38 further includes a conduit 54. The core element 40 extends through the conduit 54. The core element 40 includes a rigid rod 50 and a flexible core wire longitudinally coupled to each other with rod 50 coupled to the bobbin 42. It is to be appreciated that the core element 40 can be comprised entirely of the core wire. Furthermore, it is to be appreciated that the core element 40 can be any configuration for transmitting motion in a curved path.

The motion transmitting remote control assembly 38 further includes a support fitting 58 coupled to the conduit 54. More specifically, the support fitting 58 is coupled to the distal end of the conduit 54 adjacent to the support bracket 34. The support fitting 58 is disposed within the opening of the support bracket 34. The support bracket 34 secures the support fitting 58 to the transmission 22. As such, the support bracket 34 secures the motion transmitting remote control assembly 38 to the transmission 22 for ensuring proper routing of the motion transmitting remote control assembly 38. More specifically, the conduit 54 and the support fitting 58 are fixed to the transmission 22 with the core element 40 and bobbin 42 slidable relative to the conduit 54 and the support fitting 58.

The motion transmitting remote control assembly 38 further includes a wiper 60 coupled to the support fitting 58. More specifically, the wiper 60 is coupled to the support fitting 58 opposite the conduit 54. As such, the wiper 60 is fixed to the transmission 22 along with the conduit 54 and the support fitting 58. The wiper 60 slidably engages and forms a seal against the core element 40. The seal formed between the wiper 60 and the conduit 54 prevents intrusion of water and other contaminants between the conduit 54 and the core element 40.

The motion transmitting remote control assembly 38 includes a bobbin 42 fixed to an end of the core element 40. The bobbin 42 includes a bar 44 extending to distal ends. Additionally, the bobbin 42 includes a pair of flanges 46 with one of the flanges 46 disposed at each of the distal ends of the bar 44. Furthermore, the bar 44 has a plurality of ridges 48 extending radially from the bar 44 between the distal ends.

The motion transmitting remote control assembly 38 includes a terminal body 62. The terminal body 62 is disposed longitudinally with the core element 40 and the bobbin 42. Furthermore, the terminal body 62 is coupled to the bobbin 42, as will be explained in greater detail below. The terminal body 62 is spaced from the wiper 60 with the terminal body 62 sliding with bobbin 42 and the core element 40 toward and away from the wiper 60. It is to be appreciated that a boot can be disposed between and coupled to each of the wiper 60 and the terminal body 62, with the core element 40 partially disposed within the boot, to prevent intrusion of water and other contaminants to the core element 40.

Figure 6:
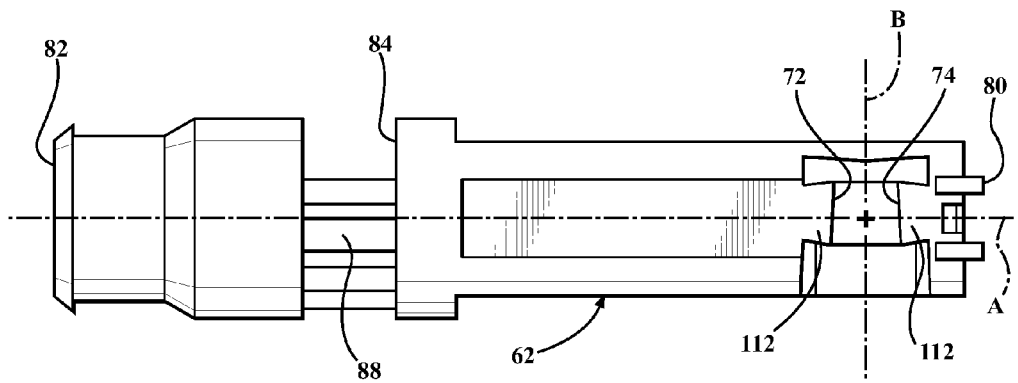
FIG. 6 is a right side plan view of the terminal body.
Figure 7:
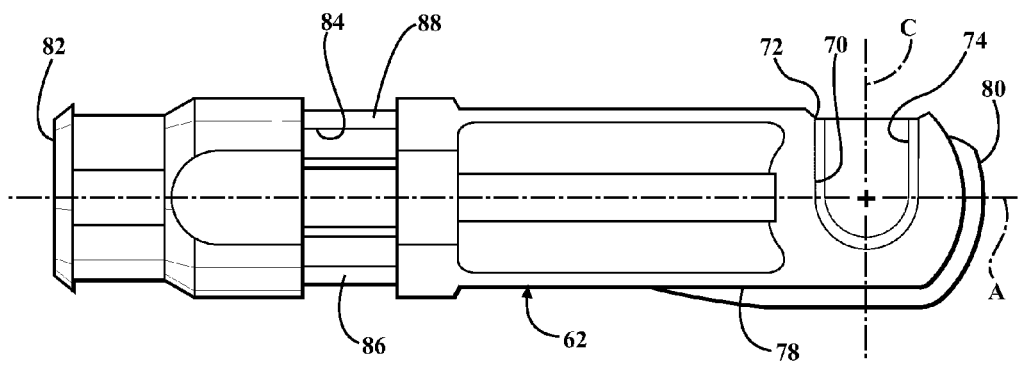
FIG. 7 is a bottom plan view of the terminal body.

The terminal body 62 defines a longitudinal axis A and a cavity 66 within the terminal body 62, as shown in FIGS. 11-15. Furthermore, the terminal body 62 includes an interior surface 68 disposed within the cavity 66. The terminal body 62 further defines a first opening 70 extending transverse to the longitudinal axis A into the cavity 66 (as shown in FIG. 7) and a second opening 72 extending transverse to both the longitudinal axis A and the first opening 70 into the cavity 66 (as shown in FIG. 6). More specifically, the terminal body 62 defines a first latitudinal axis B and a second latitudinal axis C with the first opening 70 extending into the cavity 66 along the first latitudinal axis B and the second opening 72 extending into the cavity 66 along the second latitudinal axis C. The longitudinal axis A, the first latitudinal axis B, and the second latitudinal axis C are perpendicular to each other. It is to be appreciated that the longitudinal axis A, the first latitudinal axis B, and the second latitudinal axis C can be any configuration in which each of axes A, B, C are transverse to each other. Furthermore, the first and second openings 70, 72 further define a slot 74 extending into the cavity 66 of the terminal body 62.

Figure 3:
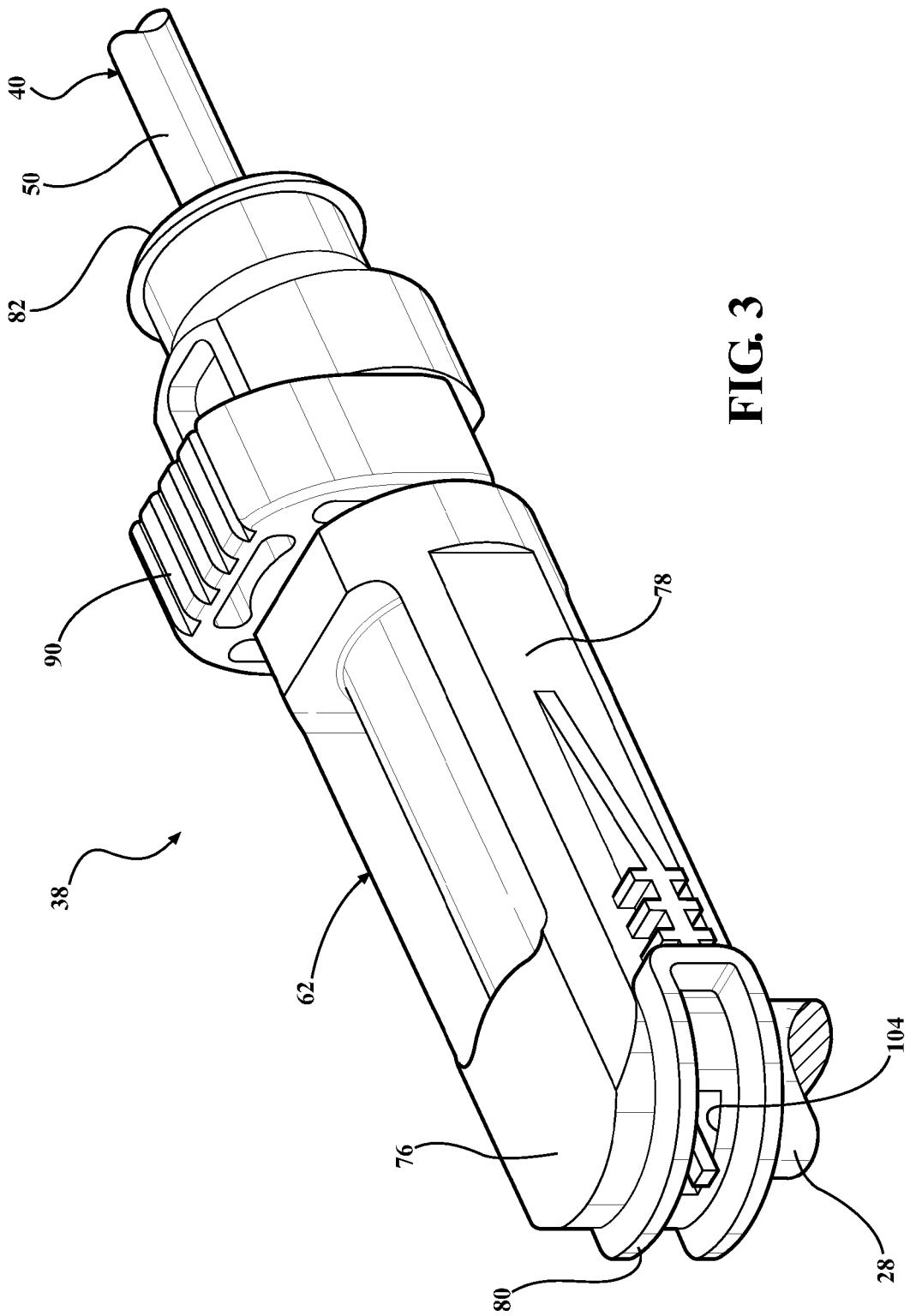
FIG. 3 is a perspective view of the terminal body coupled to the pin.
Figure 5:
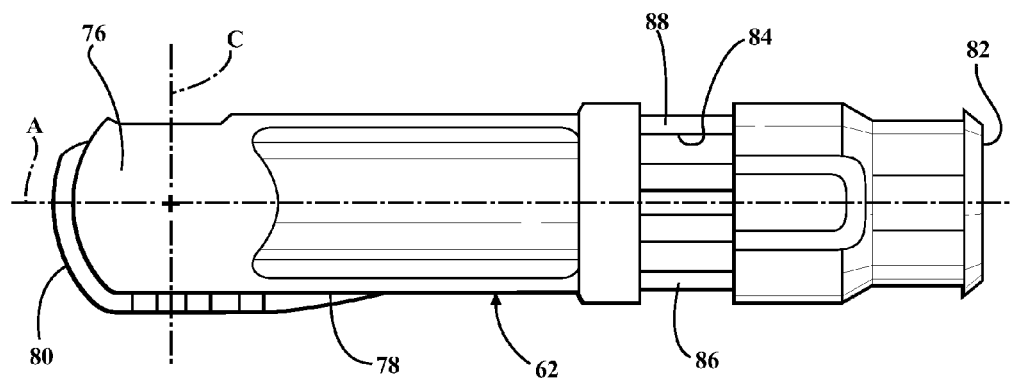
FIG. 5 is a top plan view of a terminal body.

As shown in FIG. 5, the terminal body 62 has a top cover 76 opposite the first opening 70. As such, the first opening 70 extends to and is partially defined by the top cover 76. Similarly, the terminal body 62 has a side cover 78 opposite the second opening 72, as shown in FIGS. 3 and 4. As such, the second opening 72 extends to and is partially defined by the side cover 78. Furthermore, the top cover 76 and the side cover 78 are integral with the terminal body 62.

The terminal body 62 has a first end 80 and a second end 82 disposed along the longitudinal axis A. The first end 80 is disposed adjacent to the first and second openings 70, 72 and the second end 82 is disposed opposite the first end 80. The cavity 66 of the terminal body 62 extends through the second end 82 along the longitudinal axis A.

As shown in FIGS. 12-15, the bobbin 42 is disposed in the cavity 66 of the terminal body 62. More specifically, the bobbin 42 is disposed in the cavity 66 adjacent to the second end 82 of the terminal body 62. Furthermore, the core element 40 is partially disposed in the cavity 66 and partially disposed outside of the terminal body 62 extending away from the second end 82 of the terminal body 62.

As shown in FIG. 4, the terminal body 62 further defines a hole 84 adjacent to the second end 82 and transverse to the longitudinal axis A for accessing the bobbin 42. As such, the terminal body 62 defines a first wall 86 and a second wall 88 adjacent to the hole 84. Furthermore, the first and second walls 86, 88 are spaced from and substantially parallel to each other with the cavity 66 extending between the first and second walls 86, 88.

The motion transmitting remote control assembly 38 further includes a clip 90 at least partially disposed within the hole 84 of the terminal body 62. The clip 90 couples together the bobbin 42 and the terminal body 62. The clip 90 includes a first pair of clamps 92 and a second pair of clamps 94 with the second pair of clamps 94 disposed substantially surrounding the first pair of clamps 92. The first pair of clamps 92 have a substantially circular configuration for gripping the bar 44 of the bobbin 42. The second pair of clamps 92 are configured for gripping the first and second walls 86, 88 of the terminal body 62. More specifically, first pair of clamps 92 are disposed within the hole 84 of the terminal body 62 such that the first pair of clamps 92 surround and grip the bar 44 of the bobbin 42. Furthermore, the plurality of ridges 48 extending from the bar 44 of the bobbin 42 further improve the grip of the first pair of clamps 92 on the bobbin 42. Additionally, the first pair of clamps 92 grip a portion of the bar 44 of the bobbin 42. As such, the bobbin 42 can be adjusted such that the portion of the bar 44 of the bobbin 42 that is gripped by the first pair of clamps 92 can be selected along the bar 44 between the pair of flanges 46 for reducing lash in the core element 40. Similar to the first pair of clamps 92, the second pair of clamps 92 surround and grip the first and second walls 86, 88 of the terminal body 62. The grip of the second pair of clamps 92 on the first and second walls 86, 88 and the grip of the first pair of clamps 92 on the bar 44 of the bobbin 42 ensure rigid coupling between the terminal body 62 and the core element 40.

Returning to the terminal body 62, the terminal body 62 has a column 96, as shown in FIGS. 11-15. More specifically, the column 96 is disposed between the slot 74 and the first end 80 of the terminal body 62. The column 96 extends through the cavity 66 parallel to the first latitudinal axis B. Furthermore, the column 96 is disposed adjacent to the slot 74. The column 96 of the terminal body 62 has an abutment face 98 transverse to the longitudinal axis A. Said differently, the abutment face 98 is parallel to the second latitudinal axis C. Additionally, the column 96 of the terminal body 62 has a transition face 100 parallel to the longitudinal axis A. The transition face 100 is adjacent to the abutment face 98 of the column 96 and opposes the second opening 72 of the terminal body 62. In other words, the transition face 100 of the column 96 is adjacent to the side cover 78 of the terminal body 62. Furthermore, the terminal body 62 has a sliding face 102 angular to the longitudinal axis A. Said differently, the sliding face 102 is adjacent to the transition face 100 and extends along an angle between the longitudinal axis A and the second latitudinal axis C towards the first end 80 of the terminal body 62.

The terminal body 62 further defines an aperture 104 extending into the cavity 66 substantially parallel to the longitudinal axis A. More specifically, the aperture 104 is defined between the column 96 and the side cover 78 of the terminal body 62. The purpose of the aperture 104 will be better understood as it is explained in greater detail below.

The terminal body 62 further includes a block 106 extending through the cavity 66 parallel to the first opening 70. In other words, the block 106 extends through the cavity 66 parallel to the first latitudinal axis B. Furthermore, the block 106 is disposed adjacent to the slot 74 defined by the first and second openings 70, 72, opposite the column 96.

The terminal body 62 has a retaining surface 108 extending into the cavity 66. More specifically, the retaining surface 108 extends into the cavity 66 along a plane defined by the first and second latitudinal axes B, C. The retaining surface 108 is disposed between the slot 74 and the hole 84 of the terminal body 62. The terminal body 62 defines a channel 110 parallel to the longitudinal axis A. More specifically, the channel 110 extends from the cavity 66 into the terminal body 62 opposite the top cover 76 of the terminal body 62. The channel 110 extends between the retaining surface 108 and the second end 82 of the terminal body 62.

As shown in FIGS. 2 and 6, the terminal body 62 has a ledge 112 disposed within the second opening 72. More specifically, the ledge 112 extends substantially parallel to a plane defined by the longitudinal axis A and the second latitudinal axis C. The ledge 112 has "U" configuration such that the ledge 112 is concurrently disposed on opposing sides of the second opening 72 and extend toward each other.

Figure 8:
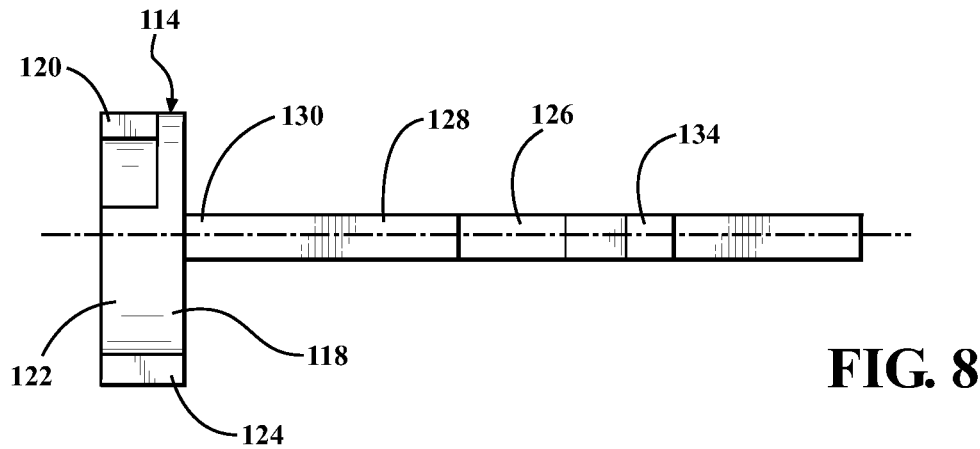
FIG. 8 is a right side plan view of a locking member.
Figure 9:
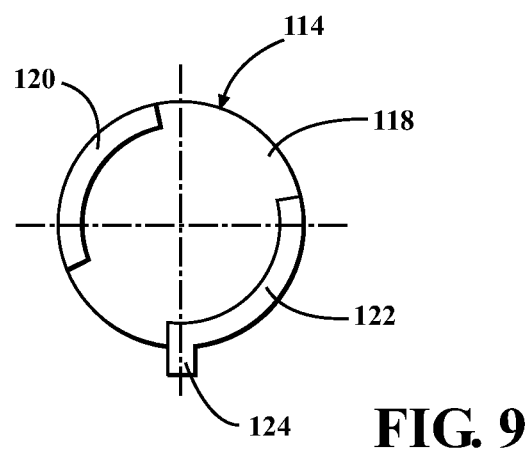
FIG. 9 is a rear plan view of the locking member.
Figure 10:
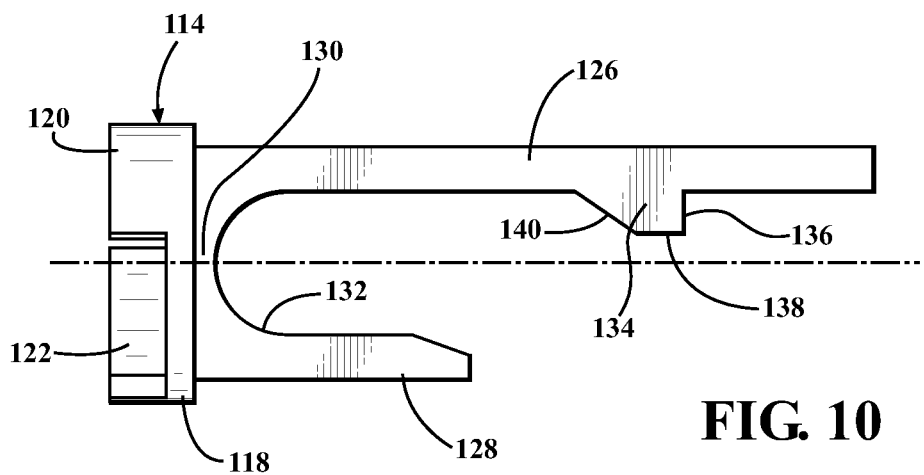
FIG. 10 is a top plan view of the locking member.
Figure 11:
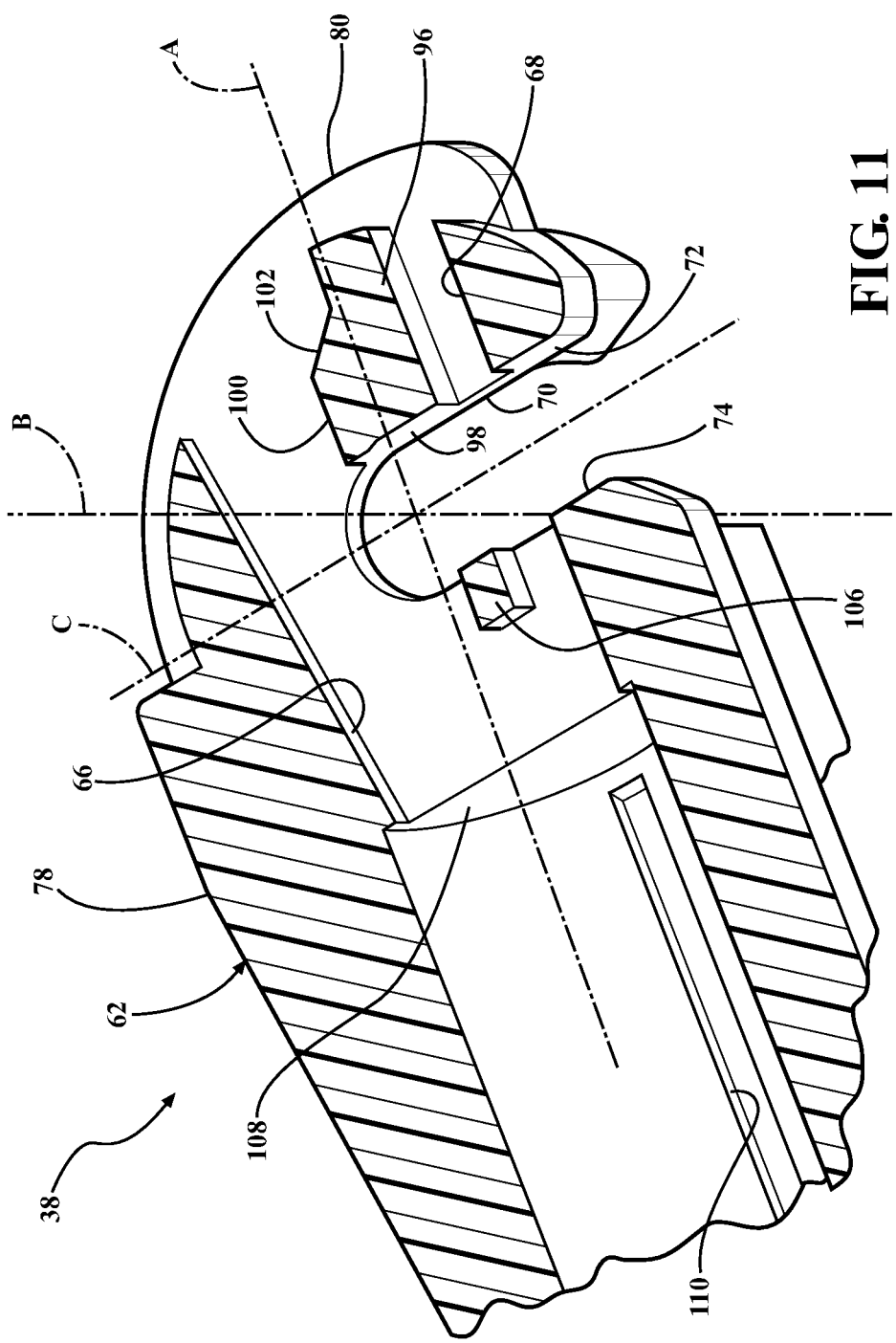
FIG. 11 is a cross-sectional perspective view of the terminal body.
Figure 12:
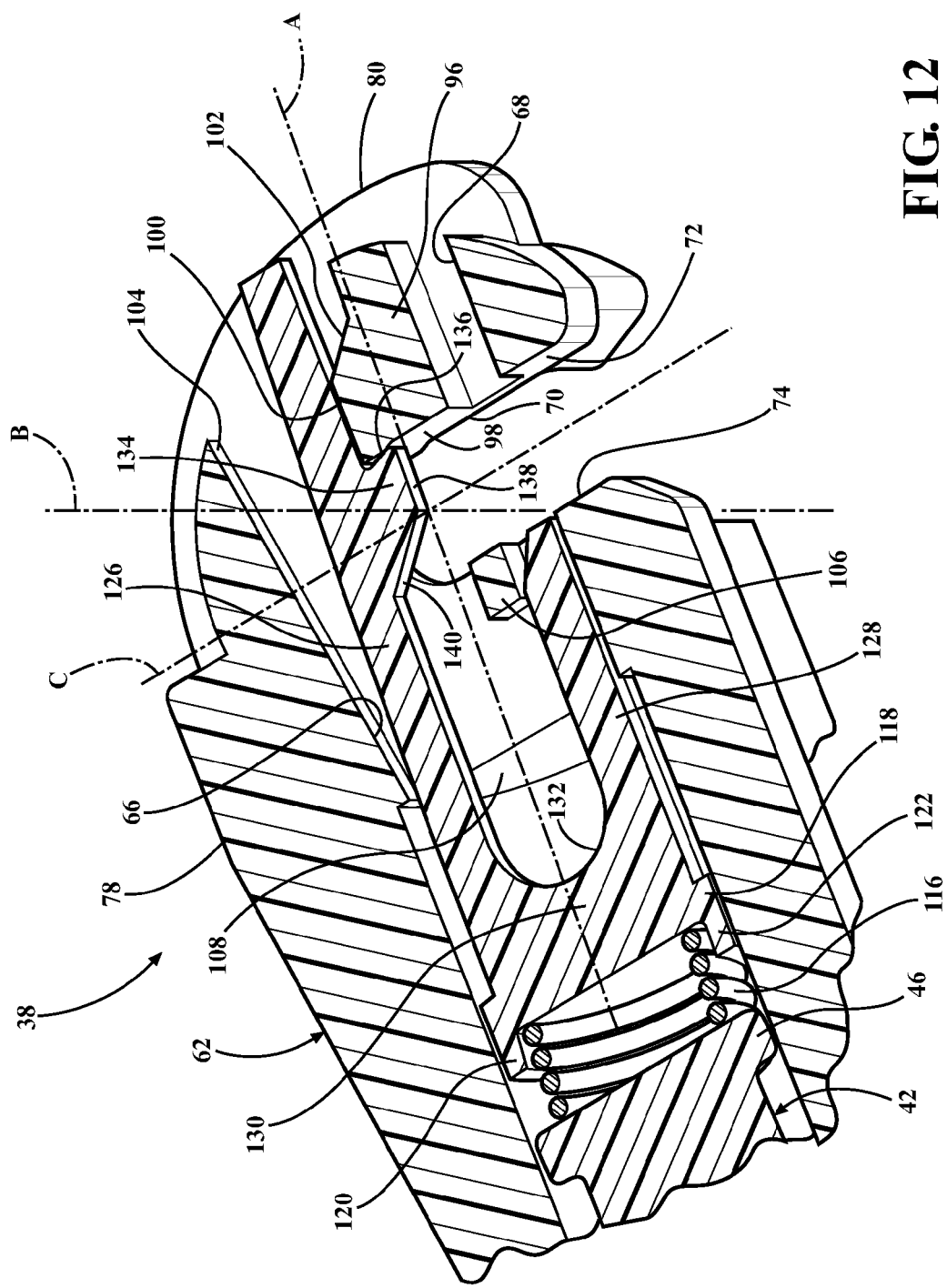
FIG. 12 is a cross-sectional perspective view of the terminal body and a locking member with the locking member in an unlocked position.
Figure 14:
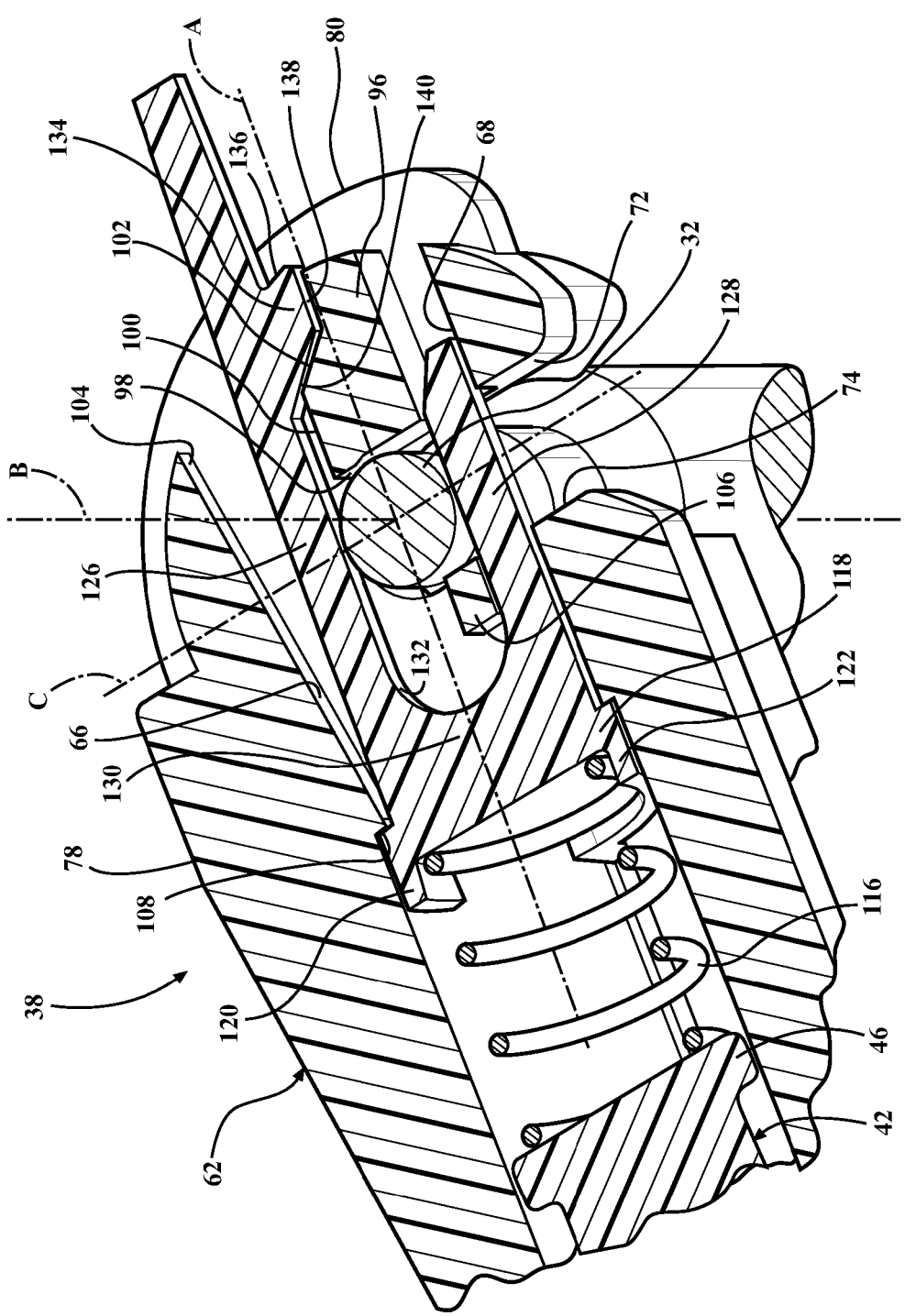
FIG. 14 is a cross-sectional perspective view of the terminal body, the locking member, and the pin with the locking member in a locked position.

The motion transmitting remote control assembly 38 further includes a locking member 114 disposed within the cavity 66 of the terminal body 62, as generally shown in FIGS. 8-10. The locking member 114 is movable between a locked position (as shown in FIG. 14) and an unlocked position (as shown in FIG. 12). More specifically, the locking member 114 moves between the locked and unlocked positions along the longitudinal axis A. Furthermore, in the locked position, the locking member 114 is disposed adjacent to the first end 80 of the terminal body 62. In the unlocked position, the locking member 114 is disposed adjacent to the second end 82 of the terminal body 62. The locking member 114 will be discussed in greater detail below.

As shown in FIGS. 12-15, the motion transmitting remote control assembly 38 further includes a biasing member 116 disposed within the cavity 66 of the terminal body 62. The biasing member 116 abuts the locking member 114 to continuously bias the locking member 114 toward the locked position. More specifically, the biasing member 116 biases the locking member 114 toward the locked position along the longitudinal axis A. Furthermore, the biasing member 116 abuts each of the bobbin 42 and the locking member 114 such that the biasing member 116 continuously biases the locking member 114 away from the bobbin 42 and toward the locked position. More specifically, the biasing member 116 abuts one of the pair of flanges 46 of the bobbin 42 disposed in the cavity 66 of the terminal body 62.

Returning to the locking member 114, the locking member 114 has a shoulder 118, as shown in FIGS. 8-10. The shoulder 118 is a substantially disk configuration having a circumference. The shoulder 118 extends radially from the locking member 114 about the longitudinal axis A. Furthermore, the shoulder 118 includes a first rib 120 and a second rib 122 disposed on the circumference of the shoulder 118. More specifically, the first and second ribs 120, 122 extend away from the shoulder 118 toward the second end 82 of the terminal body 62. The first and second ribs 120, 122 have an arcuate configuration and oppose each other on the shoulder 118. The first and second ribs 120, 122 engage the biasing member 116 to maintain abutment of the biasing member 116 with the locking member 114.

As mentioned above, the retaining surface 108 of the terminal body 62 extends into the cavity 66. As shown in FIG. 14, the shoulder 118 of the locking member 114 engages the retaining surface 108 when the locking member 114 is in the locked position to at least partially retain the locking member 114 in the cavity 66 of the terminal body 62. Furthermore, the locking member 114 has a tab 124, as shown in FIG. 9. The tab 124 is disposed in and translates in the channel 110 along the longitudinal axis A as the locking member 114 moves between the locked and unlocked positions. The disposition of the tab 124 in the channel 110 maintains the rotational position of the locking member 114 within the cavity 66 of the terminal body 62. In addition, the tab 124 and the channel 110 ensure proper positioning of the locking member 114 in the terminal body 62 during assembly.

As shown in FIG. 10, the locking member 114 has a trigger portion 126 retaining the locking member 114 in the unlocked position and a securing portion 128 spaced from the trigger portion 126. More specifically, the trigger portion 126 and the securing portion 128 are substantially parallel to each other and extend from the shoulder 118 toward distal ends proximate the first end 80 of the terminal body 62. Furthermore, the trigger portion 126 and the securing portion 128 are disposed along a plane defined by the longitudinal axis A and the second latitudinal axis C, as shown in FIG. 12.

The locking member 114 has an intermediate portion 130 interconnecting the trigger portion 126 and the securing portion 128 and defining a locking cavity 132 therebetween, as shown in FIG. 10. As a result, the trigger portion 126 flexes relative to the connection of the trigger portion 126 to the intermediate portion 130 as the locking member 114 moves between the locked and unlocked positions. The flexing of the trigger portion 126 will be better understood as it is explained in greater detail below.

As shown in FIGS. 12-15, the trigger portion 126 of the locking member 114 has a protrusion 134 extending toward the second opening 72 of the terminal body 62 such that the protrusion 134 selectively engages the column 96 of the terminal body 62 as the locking member 114 moves between the locked and unlocked positions. More specifically, the protrusion 134 extends from the trigger portion 126 between the intermediate portion 130 of the terminal body 62 and the distal end toward the securing portion 128 of the locking member 114. Furthermore, the protrusion 134 of the trigger portion 126 of the locking member 114 has an abutment surface 136 transverse to the longitudinal axis A. Said differently, the abutment surface 136 is disposed substantially parallel to the second latitudinal axis C of the terminal body 62. The abutment surface 136 engages the abutment face 98 in the unlocked position to hold the locking member 114 in the unlocked position against the bias of the biasing member 116 toward the locked position, as shown in FIG. 12.

Figure 13:
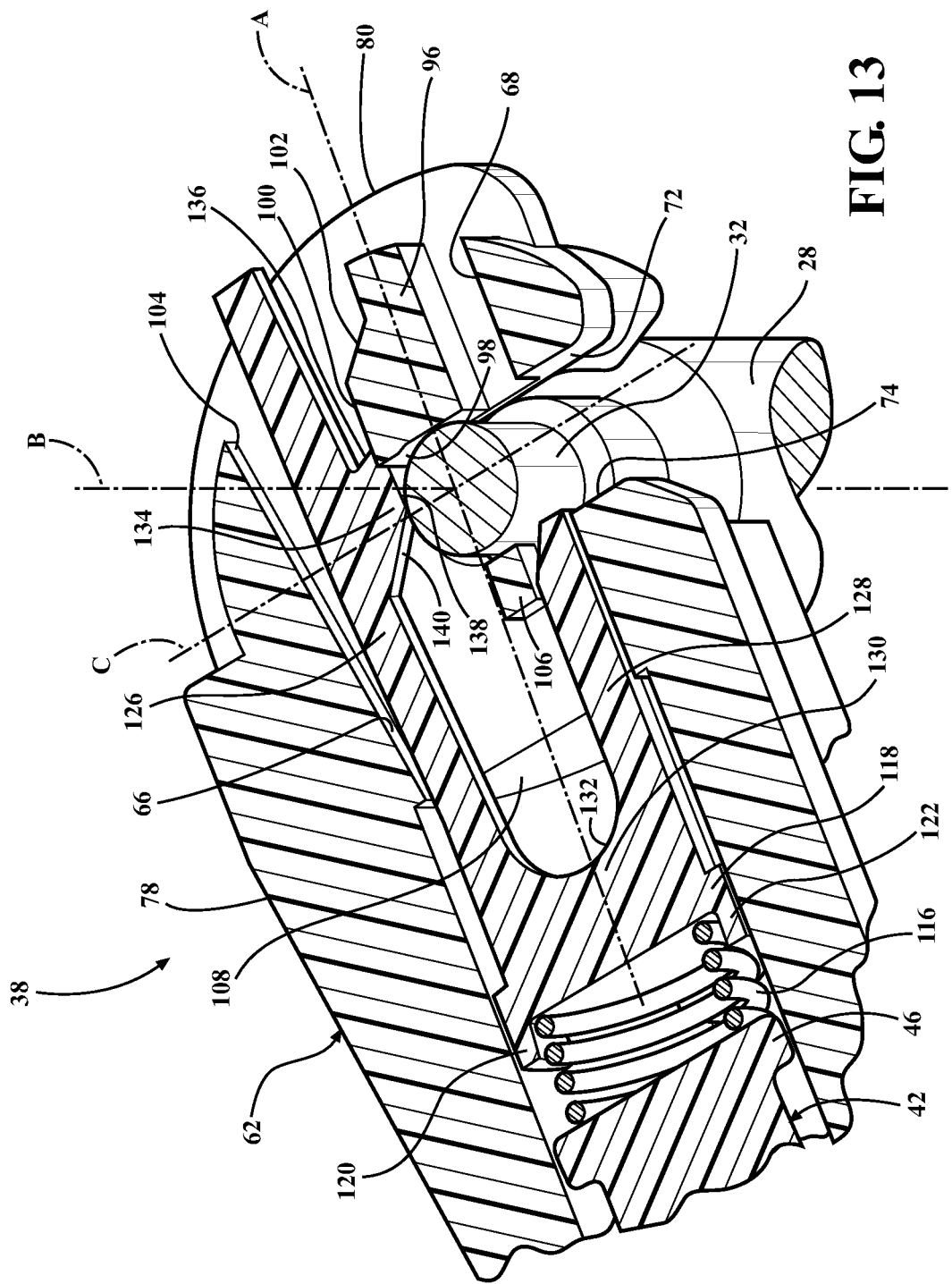
FIG. 13 is a cross-sectional perspective view of the terminal body, the locking member, and a pin with the pin engaging the locking member.

The protrusion 134 of the trigger portion 126 of the locking member 114 has a transition surface 138 substantially parallel to the longitudinal axis A. More specifically, the transition surface 138 is adjacent to the abutment surface 136 of the protrusion 134. The transition surface 138 engages the transition face 100 of the column 96 as the locking member 114 moves between the locked and unlocked positions, as shown in FIG. 13. More specifically, the transition surface 138 slidably engages the transition face 100 as the locking member 114 moves between the locked and unlocked positions. Moreover, the trigger portion 126 flexes relative to the connection of the trigger portion 126 to the intermediate portion 130 away from the securing portion 128 as the transition surface 138 engages the transition face 100.

The protrusion 134 of the trigger portion 126 of the locking member 114 has a sliding surface 140 angular to the longitudinal axis A. More specifically, the sliding surface 140 is adjacent to the transition surface 138 of the protrusion 134 and extends from the transition surface 138 along an angle between the longitudinal axis A and the second latitudinal axis C toward the second end 82 of the terminal body 62. The sliding surface 140 and the sliding face 102 abut each other in the locked position to facilitate movement of the protrusion 134 along the column 96 and concurrent movement of the locking member 114 along the longitudinal axis A from the locked position to the unlocked position, as shown in FIG. 14. More specifically, abutment of the sliding surface 140 with the sliding face 102 causes concurrent flexing of the trigger portion 126 relative to the connection of the trigger portion 126 to the intermediate portion 130 away from the securing portion 128 as the locking member 114 moves from the locked position toward the unlocked position. The concurrent flexing of the trigger portion 126 allows the protrusion 134 of the locking member 114 to move along the column 96 of the terminal body 62. The movement of the protrusion 134 along the column 96 and concurrent movement of the locking member 114 along the longitudinal axis A from the locked position to the unlocked position will be better understood as it is explained in greater detail below.

As mentioned above, the terminal body 62 further includes the block 106 extending through the cavity 66 parallel to the first opening 70, as shown in FIGS. 11-15. The block 106 selectively engages and guides the movement of the securing portion 128 of the locking member 114 parallel to the longitudinal axis A as the locking member 114 moves between the locked and unlocked positions. More specifically, the securing portion 128 is disposed between the block 106 and the interior surface 68 of the terminal body 62 adjacent the second opening 72 of the terminal body 62. Flexing of the trigger portion 126 relative to the connection of the trigger portion 126 to the intermediate portion 130 as the locking member 114 moves between the locked and unlocked positions causes the securing portion 128 to flex with the trigger portion 126. The securing portion 128 engages the block 106 such that the block 106 stops the further flexing of the securing portion 128 with the flexing of the trigger portion 126.

As mentioned above, the terminal body 62 further defines the second opening 72 extending transverse to both the longitudinal axis A and the first opening 70 into the cavity 66. The second opening 72 provides access to the trigger portion 126 to release the locking member 114 from the unlocked position such that the locking member 114 moves from the unlocked position to the locked position and the securing portion 128 at least partially closes the second opening 72. More specifically, in the unlocked position the abutment surface 136 of the protrusion 134 of the trigger portion 126 engages the abutment face 98 of the column 96 of the terminal body 62, as shown in FIG. 12. Furthermore, the protrusion 134 is at least partially disposed in the slot 74 defined by the first and second openings 70, 72. The access to the trigger portion 126 is further defined as access to the protrusion 134 such that the trigger portion 126 flexes relative to the connection of the trigger portion 126 to the intermediate portion 130. Flexing of the trigger portion 126 disengages the abutment surface 136 from the abutment face 98. The bias of the biasing member 116 moves the locking member 114 from the unlocked position toward the locked position. The transition surface 138 of the protrusion 134 moves along the transition face 100 of the column 96 (as shown in FIG. 13) which transitions to movement of the sliding surface 140 of the protrusion 134 along the sliding face 102 of the column 96 (as shown in FIG. 14). At this instance, the locking member 114 reaches the locked position.

Additionally, during movement of the locking member 114 from the unlocked position to the locked position, the securing portion 128 moves within the cavity 66 of the terminal body 62 substantially parallel to the longitudinal axis A. As mentioned above, the block 106 of the terminal body 62 selectively engages and guides the movement of the securing portion 128. In the unlocked position, the distal end of the securing portion 128 is disposed between the slot 74 and the second end 82 of the terminal body 62, as shown in FIG. 12. As the locking member 114 moves from the unlocked position to the locked position, the distal end moves across the second opening 72 of the terminal body 62. In the locked position, the distal end of the securing portion 128 is disposed between the column 96 and the interior surface 68 of the terminal body 62 adjacent to the second opening 72, as shown in FIG. 14. Although the distal end of the securing portion 128 is disposed between the column 96 and the interior surface 68 such that the securing portion 128 fully closes the second opening 72, it is to be appreciated that distal end can extend partially into the second opening 72 in the locked position such that the securing portion 128 partially closes the second opening 72.

As mentioned above, the terminal body 62 further defines the aperture 104 extending into the cavity 66 substantially parallel to the longitudinal axis A. Furthermore, the trigger portion 126 of the locking member 114 is partially disposed in the aperture 104. More specifically, as mentioned above, the trigger portion 126 extends past the protrusion 134 to the distal end. In the unlocked position, a section of the trigger portion 126 between the protrusion 134 and the distal end is disposed in the aperture 104, as shown in FIG. 12. The trigger portion 126 of the locking member 114 is partially disposed in the aperture 104 of the terminal body 62 and partially disposed outside of the terminal body 62 in the locked position to provide access to the trigger portion 126 in the locked position, as shown in FIG. 14. Said differently, in the locked position, the section of the trigger portion 126 between the protrusion 134 and the distal end is partially disposed in the aperture 104 of the terminal body 62. In the locked position the trigger portion 126 extends through the terminal body 62 such that the distal end of the trigger portion 126 is disposed outside of the terminal body 62.

Figure 15:
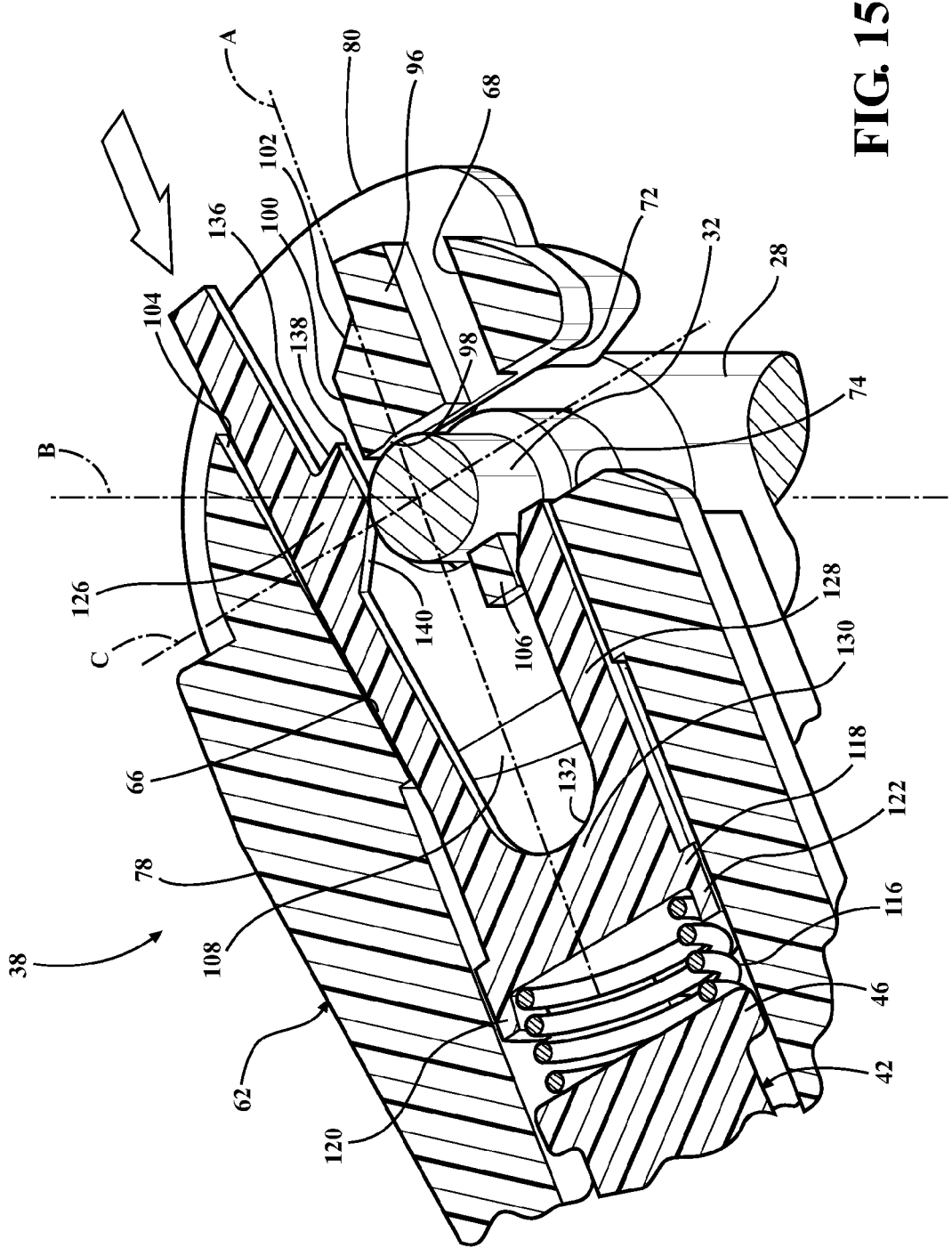
FIG. 15 is a cross-sectional perspective view of the terminal body, the locking member, and the pin with the locking member moving from the locked position to the unlocked position.

As shown in FIG. 15, access to the trigger portion 126 in the locked position is further defined as a user moving the locking member 114 from the locked position toward the unlocked position. As mentioned above, abutment of the sliding surface 140 of the protrusion 134 of the trigger portion 126 with the sliding face 102 of the column 96 causes concurrent flexing of the trigger portion 126 relative to the connection of the trigger portion 126 to the intermediate portion 130 away from the securing portion 128 as the locking member 114 moves from the locked position toward the unlocked position. The concurrent flexing of the trigger portion 126 allows the protrusion 134 of the locking member 114 to move along the column 96 of the terminal body 62. More specifically, movement of the protrusion 134 along the column 96 as the locking member 114 moves from the locked position to the unlocked position is further defined as movement of the sliding surface 140 along the sliding face 102 which transitions to movement of the transition surface 138 along the transition face 100 which further transitions to engagement of the abutment surface 136 with the abutment face 98 in the unlocked position to hold the locking member 114 in the unlocked position.

Additionally, during movement of the locking member 114 from the locked position to the unlocked position, the securing portion 128 moves within the cavity 66 of the terminal body 62 substantially parallel to the longitudinal axis A. In the locked position, the distal end of the securing portion 128 is disposed between the column 96 and the interior surface 68 of the terminal body 62. As the locking member 114 moves from the locked position to the unlocked position, the distal end moves across the second opening 72 of the terminal body 62 toward the second end 82. In the unlocked position, the securing portion 128 is disposed between the slot 74 and the second end 82 of the terminal body 62 such that the second opening 72 is open.

The second opening 72 is configured such that the second opening 72 is substantially an inverse of a longitudinal cross-section through the pin 28, as shown in FIG. 6. As such, the pin 28 is accepted into the second opening 72 with the second opening 72 planar to the longitudinal cross-section of the pin 28. Furthermore, the ledge 112, as well as a plurality of surfaces within the second opening 72, have varying angular configurations such that the ledge 112 and the surfaces angle away from the longitudinal axis A and the first latitudinal axis B, as shown in FIG. 6. The varying angular configurations of the ledge 112 and the surfaces accommodate positions of the pin 28 in which the longitudinal cross-section of the pin 28 is slightly askew to the second opening 72. As shown in FIGS. 12-14, the pin 28 engages the trigger portion 126 through the second opening 72 to release the locking member 114 from the unlocked position such that the locking member 114 moves from the unlocked position to the locked position. More specifically, the neck 32 of the pin 28 accesses and engages the protrusion 134 of the trigger portion 126 such that the trigger portion 126 flexes relative to the connection of the trigger portion 126 to the intermediate portion 130. As previously mentioned, flexing of the trigger portion 126 disengages the abutment surface 136 from the abutment face 98. Furthermore, the bias of the biasing member 116 moves the locking member 114 from the unlocked position toward the locked position. Concurrently with the movement of the locking member 114 from the unlocked position to the locked position, the securing portion 128 at least partially closes the second opening 72 such that the locking member 114 partially surrounds the pin 28 to secure the pin 28 to the motion transmitting remote control assembly 38. More specifically, the locking member 114 partially surrounds the neck 32 of the pin 28 such that the neck 32 is disposed within the locking cavity 132 of the locking member 114. The at least partial closure of the second opening 72 of the terminal body 62 by the securing portion 128 of the locking member 114 prevents movement of the pin 28 out of the terminal body 62 through the second opening 72.

As mentioned above, the terminal body 62 has the ledge 112 disposed within the second opening 72 and the pin 28 has the head 30. The head 30 engages the ledge 112 to retain the pin 28 in the terminal body 62 relative to the first opening 70, as generally shown in FIGS. 1B and 2. More specifically, the engagement of the head 30 with ledge 112 prevents movement of the pin 28 out of the terminal body 62 through the first opening 70.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly for transmitting motion in a curved path, said assembly comprising:
   a terminal body defining a longitudinal axis and a cavity within said terminal body with said terminal body further defining a first opening extending transverse to said longitudinal axis into said cavity;
   a locking member disposed within said cavity of said terminal body and movable between a locked position and an unlocked position with said locking member having a trigger portion retaining said locking member in said unlocked position and a securing portion spaced from said trigger portion; and
   a biasing member disposed within said cavity of said terminal body and abutting said locking member to continuously bias said locking member toward said locked position;
   said terminal body further defining a second opening extending transverse to both said longitudinal axis and said first opening into said cavity to provide access to said trigger portion to release said locking member from said unlocked position such that said locking member moves from said unlocked position to said locked position and said securing portion at least partially closes said second opening.

2. A motion transmitting remote control assembly as set forth in claim 1 wherein said terminal body has a top cover opposite said first opening with said first opening extending to and partially defined by said top cover.

3. A motion transmitting remote control assembly as set forth in claim 1 wherein said terminal body has a side cover opposite said second opening with said second opening extending to and partially defined by said side cover.

4. A motion transmitting remote control assembly as set forth in claim 1 wherein said locking member includes an intermediate portion interconnecting said trigger portion and said securing portion and defining a locking cavity therebetween with said trigger portion flexing relative to the connection of said trigger portion to said intermediate portion as said locking member moves between said locked and unlocked positions.

5. A motion transmitting remote control assembly as set forth in claim 1 wherein said trigger portion of said locking member has a protrusion extending toward said second opening of said terminal body and said terminal body has a column such that said protrusion selectively engages said column as said locking member moves between said locked and unlocked positions.

6. A motion transmitting remote control assembly as set forth in claim 5 wherein said protrusion of said trigger portion of said locking member has an abutment surface transverse to said longitudinal axis and said column of said terminal body has an abutment face transverse to said longitudinal axis such that said abutment surface engages said abutment face in said unlocked position to hold said locking member in said unlocked position against the bias of said biasing member toward said locked position.

7. A motion transmitting remote control assembly as set forth in claim 5 wherein said protrusion of said trigger portion of said locking member has a transition surface substantially parallel to said longitudinal axis and said column of said terminal body has a transition face parallel to said longitudinal axis such that said transition surface engages said transition face as said locking member moves between said locked and unlocked positions.

8. A motion transmitting remote control assembly as set forth in claim 5 wherein said protrusion of said trigger portion of said locking member has a sliding surface angular to said longitudinal axis and said column of said terminal body has a sliding face angular to said longitudinal axis such that said sliding surface and said sliding face abut each other in said locked position to facilitate movement of said protrusion along said column and concurrent movement of said locking member along said longitudinal axis from said locked position to said unlocked position.

9. A motion transmitting remote control assembly as set forth in claim 1 wherein said terminal body further defines an aperture extending into said cavity substantially parallel to said longitudinal axis with said trigger portion of said locking member partially disposed in said aperture.

10. A motion transmitting remote control assembly as set forth in claim 9 wherein said trigger portion of said locking member is partially disposed in said aperture of said terminal body and partially disposed outside of said terminal body in said locked position to provide access to said trigger portion in said locked position.

11. A motion transmitting remote control assembly as set forth in claim 1 wherein said terminal body further includes a block extending through said cavity parallel to said first opening to selectively engage and guide the movement of said securing portion of said locking member parallel to said longitudinal axis as said locking member moves between said locked and unlocked positions.

12. A motion transmitting remote control assembly as set forth in claim 1 wherein said locking member has a tab and said terminal body defines a channel parallel to said longitudinal axis with said tab disposed in and translating in said channel along said longitudinal axis as said locking member moves between said locked and unlocked positions.

13. A motion transmitting remote control assembly as set forth in claim 1 wherein said locking member has a shoulder and said terminal body has a retaining surface extending into said cavity such that said shoulder engages said retaining surface when said locking member is in said locked position to at least partially retain said locking member in said cavity of a said terminal body.

14. A motion transmitting remote control assembly as set forth in claim 1 wherein said terminal body has a first end and a second end disposed along said longitudinal axis with said first end disposed adjacent to said first and second openings and said second end disposed opposite said first end, with said cavity extending through said second end along said longitudinal axis.

15. A motion transmitting remote control assembly as set forth in claim 14 further including a core element and a bobbin fixed to an end of said core element with said bobbin disposed in said cavity of said terminal body and said core element partially disposed in said cavity and partially disposed outside of said terminal body extending away from said second end of said terminal body.

16. A motion transmitting remote control assembly as set forth in claim 15 wherein said terminal body further defines a hole adjacent to said second end and transverse to said longitudinal axis for accessing said bobbin.

17. A motion transmitting remote control assembly as set forth in claim 16 further including a clip at least partially disposed within said hole of said terminal body to couple together said bobbin and said terminal body.

18. A motion transmitting remote control assembly as set forth in claim 15 wherein said biasing member abuts each of said bobbin and said locking member such that said biasing member continuously biases said locking member away from said bobbin and toward said locked position.

19. A motion transmitting remote control assembly as set forth in claim 1 further including a conduit with said core element extending through said conduit.

20. A shift mechanism for selecting one of a plurality of gears of a transmission of a vehicle, said shift mechanism comprising:
 a lever adapted to be pivotably coupled to the transmission with said lever pivotable between a plurality of positions;
 a pin mounted to said lever for concurrent movement of said pin and said lever between said positions; and
 a motion transmitting remote control assembly comprising:
  a terminal body defining a longitudinal axis and a cavity within said terminal body with said terminal body further defining a first opening extending transverse to said longitudinal axis into said cavity;
  a locking member disposed within said cavity of said terminal body and movable between a locked position and an unlocked position with said locking member having a trigger portion retaining said locking member in said unlocked position and a securing portion spaced from said trigger portion; and
  a biasing member disposed within said cavity of said terminal body and abutting said locking member to continuously bias said locking member toward said locked position;
  said terminal body further defining a second opening extending transverse to both said longitudinal axis and said first opening into said cavity with said pin engaging said trigger portion through said second opening to release said locking member from said unlocked position such that said locking member moves from said unlocked position to said locked position and said securing portion at least partially closes said second opening such that said locking member partially surrounds said pin to secure said pin to said motion transmitting remote control assembly.

21. A shift mechanism as set forth in claim 20 wherein said terminal body has a ledge disposed within said second opening and said pin has a head with said head engaging said ledge to retain said pin in said terminal body relative to said first opening.

* * * * *